United States Patent [19]
Check

[11] Patent Number: 5,498,150
[45] Date of Patent: Mar. 12, 1996

[54] HIGH THERMAL CAPACITY MOLD ASSEMBLY

[76] Inventor: John M. Check, 3212 Wabanaki Trail, Traverse City, Mich. 49684

[21] Appl. No.: 370,408

[22] Filed: Jan. 9, 1995

[51] Int. Cl.⁶ .................................................. B29C 49/06
[52] U.S. Cl. ........................ 425/526; 264/528; 425/528; 425/533; 425/547
[58] Field of Search ...................................... 425/143, 144, 425/149, 526, 528, 533, 572, 547; 264/40.6, 328.8, 513, 528

[56] References Cited

U.S. PATENT DOCUMENTS

| | | | |
|---|---|---|---|
| 4,592,719 | 6/1986 | Bellehache et al. | 425/526 |
| 4,655,280 | 4/1987 | Takahashi | 165/47 |
| 5,055,025 | 10/1991 | Muller | 425/144 |
| 5,423,670 | 6/1995 | Hamel | 425/144 |

*Primary Examiner*—Tim Heitbrink

*Attorney, Agent, or Firm*—Reising, Ethington, Barnard & Perry

[57] ABSTRACT

A mold assembly has a mold part with a plurality of elongated cavities therein forming the outer wall of a molded part and wherein a fluid cooled core is inserted within each of the elongated cavities having an outer surface forming the inner wall of the molded part and the fluid cooled core includes an inner surface having a plurality of circumferentially spaced, longitudinally directed ribs for reinforcing the fluid cooled core radially inwardly of the elongated cavities and along the length of said fluid cooled core to control core deflection. A fluid inlet pipe is located axially of the inner surface in spaced relationship thereto having one end thereof adapted to be connected to a source of coolant and including a second end thereon in communication with a plurality of circumferentially spaced passages formed between each of the longitudinally directed ribs and wherein each of the passages returns flow to an elongated annular passage between the fluid inlet pipe and the inner surface.

8 Claims, 2 Drawing Sheets

HIGH THERMAL CAPACITY MOLD ASSEMBLY

TECHNICAL FIELD

This invention relates to molding apparatus and more particularly to molding apparatus having a water cooled core located within a mold cavity for defining a hollow molded part shape.

BACKGROUND OF THE INVENTION

In order to decrease cycle time and to insure good molding of either metal casting or injection molded plastic parts it is necessary to provide coolant flow passages within the mold apparatus for removing heat from the apparatus during the molding process. In the case of molding apparatus with a mold cavity part having a plurality of female cavities formed therein that receive core parts that cooperate with the female cavities to form the surfaces of a molded part, apparatus for cooling has included a round cooling tube that is formed by the interior surface of the core part. An example of such cooling apparatus is set-forth in U.S. Pat. No. 4,655,280.

One problem with such arrangements is that molded parts having an elongated configuration require a core with a length to width ratio that can cause the core to deflect when material is injected against the core under high pressure conditions. Since many materials are best shaped and densified under such high pressure conditions, one problem with prior art apparatus is how to provide a low cost core that will not deflect or warp under high temperature and high pressure operation.

Another problem with such molding apparatus is that the coolant flow is restricted to an annular surface that limits the removal of heat from each of the mold cavities.

SUMMARY OF THE DISCLOSURE

In accordance with one aspect of the present invention, the problem of core deflection and cooling is solved by a fluid cooled core assembly having a core element that is opened at one end and closed by a hemispherical surface at its opposite end. The core includes an outer surface for forming the inner surface of a molded part and the core further includes an inner surface having a plurality of circumferentially spaced, longitudinally directed ribs for reinforcing the fluid cooled core radially inwardly of the elongated cavities and along the length of said fluid cooled core for maintaining the structural integrity of the fluid cooled core within each of the elongated cavities.

In another aspect of the present invention, the fluid cooled core assembly includes a fluid inlet pipe located axially of the inner surface in spaced relationship thereto having one end thereof adapted to be connected to a source of coolant and including a second end thereon in communication with a plurality of circumferentially spaced, longitudinally directed passages formed between each of the longitudinally directed ribs.

In a specific embodiment, the reinforcing ribs are formed in the part molding area that in the illustrated case is only along part of the length of the inner surface of the core element such that the circumferentially spaced, longitudinally directed passages begin at the hemispherical surface and end at approximately the mid point of the core element and wherein each of the passages returns flow to an elongated annular passage between the fluid inlet pipe and the inner surface for reducing the total pressure drop of the coolant between inlet and outlet connections for flow of coolant through the core element.

In still another embodiment of the invention the ribs are formed integrally of the inner surface and in another embodiment the ribs are formed as separate elements bonded to the inner surface of the core element.

BRIEF DESCRIPTION OF THE DRAWINGS

Reference is now made to the accompanying drawings wherein.

DETAILED DESCRIPTION OF THE PREFERRED EMBODIMENTS

Figure 1:
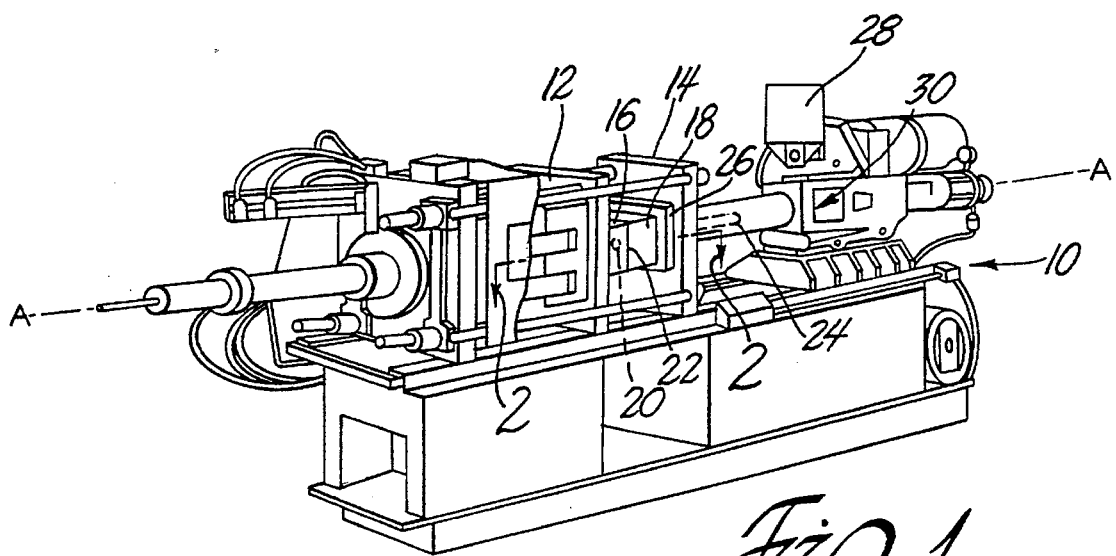
FIG. 1 is a perspective view of mold apparatus including the present invention.

FIG. 1 illustrates a representative injection mold assembly 10 comprising two relatively moveable platens 12, 14 carrying mold parts 16, 18 that are positioned along a horizontal axis A—A between opened and closed positions in a known manner.

Figure 2:
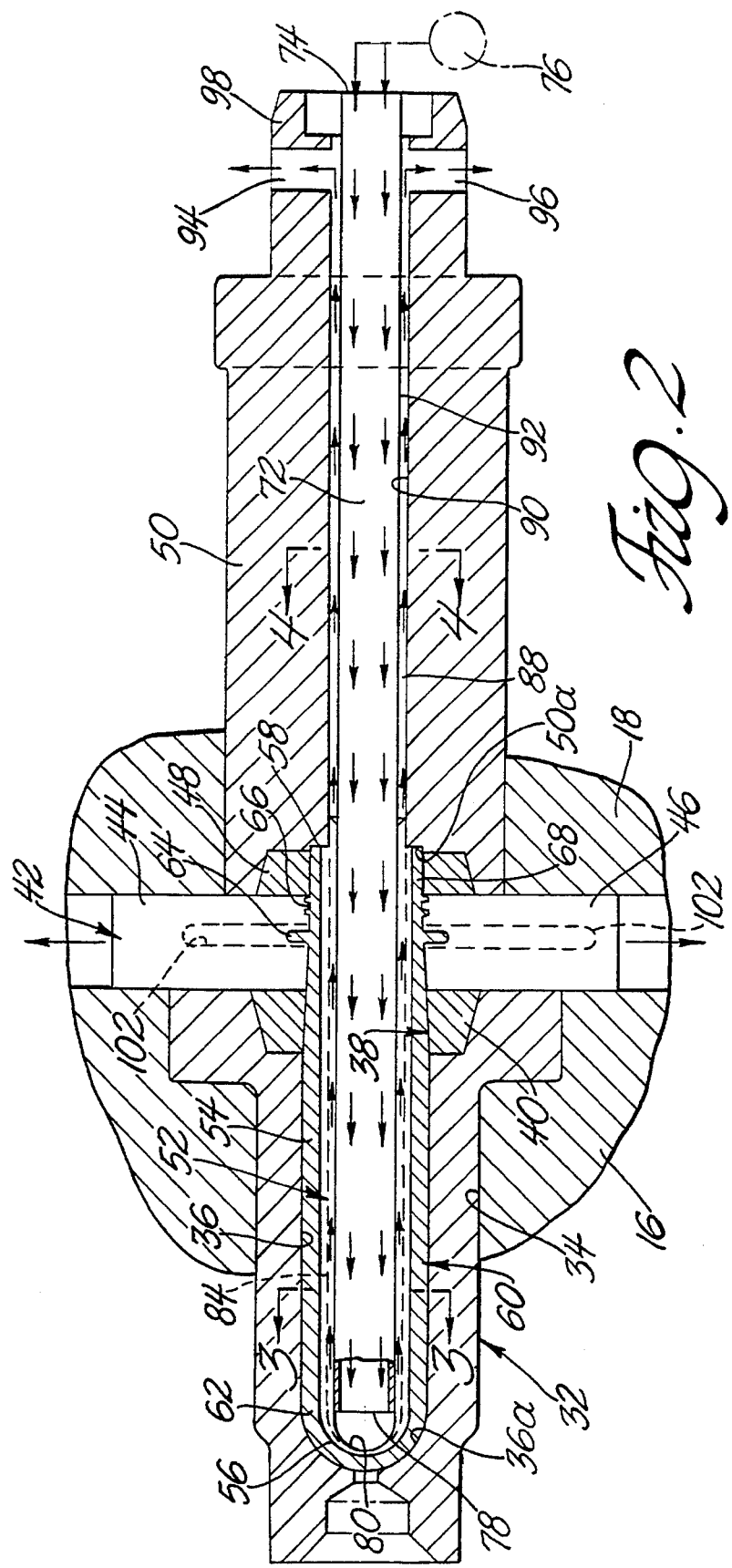
FIG. 2 is a fragmentary enlarged sectional view of the mold apparatus shown in FIG. 1 taken along the line 2—2 looking in the direction of the arrows.

In accordance with one aspect of the present invention, the mold parts 16, 18 are associated with a plurality of water cooled core assemblies 20 one of which is shown in detail in FIG. 2.

The mold apparatus 10 is separable along a parting line 22 when the mold is opened and molded parts are ejected from the assembly 10 in a known manner. Additionally, as is well known, the mold assembly 10 includes an inflow passage 24 for supplying molten material, either plastic or metal from an injector 26. In the illustrated arrangement the supply of material is from a dry feed supply hopper 28 that is connected to a screw type feed 30. In the case of a metal casting machine the machine includes a source of molten metal that is injected into the mold assembly.

While a horizontal type, plastic injection molding machine is shown, the present invention has application in vertical press injection molding apparatus of either the plastic injection or metal injection type. Furthermore, while water cooling is discussed herein, it will be understood that the cooling passages to be described can be connected to any source of coolant.

In the illustrated mold apparatus 10, the mold part 16 includes a plurality of female mold cavity parts 32. As shown in FIG. 2, each of the female mold cavity parts 32 is seated in an opening 34 within the mold part 16. The female mold cavity part 32 includes an inner surface 36 with a hemispherical end surface 36a. An elongated annular surface 38 is formed by female mold cavity part 32; a split mold insert 40; a mold parting plate 42 having first and second separable parts 44, 46 and a split mold insert 48 and a core support member 50 supported within the mold part 18. The inserts 40, 48 and parts 44, 46 are all separable along the parting line 22 when the mold apparatus 10 is opened.

The core support member 50 carries a hollow core member 52 having an outer surface 54 with a hemispherical end surface 56. The outer surface 54 extends through the mold insert 48 and terminates at an end surface 58 that is abutted against an end surface 50a on the core support member 50.

The hemispherical surface 56 is located in spaced relationship with the hemispherical surface end surface 36a while the outer surface 54 is located in spaced relationship with the elongated annular surface 38 formed by the mold parts 32, 40, 42 and 48 as previously described so as to define a molded part cavity 60 that has a tubular end segment 62; a large diameter annular segment 64; a pair of small diameter diameter segments 66 and a smaller diameter neck 68 together defining the outer surface shape of a hollow molded part that is formed when injected material fills the cavity 60 and is densified therein, cooled and ejected therefrom. In the illustrated embodiment, the thread split at 40, 42, 44, 46 and 48 holds the molded part while the core member 52 is removed as mold parts 16, 18 are separated.

The shape of the molded part in the illustrated embodiment is suitable for use as a parison in blow molding. The general shape of the molded part can be varied to form a variety of products requiring a hollow open ended shape. The apparatus and cooling process to be described are applicable to most molding applications such as glass, metal or plastic of most part configurations.

One feature of the present invention is that the cooled core assembly 20 includes a coolant inlet pipe 72 located axially of the hollow core member 52 in spaced relationship. One end 74 of the inlet pipe 72 is adapted to be connected to a coolant source 76. A second end 78 of the coolant inlet pipe 72 discharges against a hemispherically shaped surface 80 on the inside of the hollow core member 52 for redirecting coolant from the inlet pipe 72 through a plurality of circumferentially spaced, longitudinally directed coolant return passages 82 formed between each of a plurality of circumferentially spaced, longitudinally directed ribs 84 on the inner surface 86 of the hollow core member 52 downstream of the surface 80.

In the illustrated embodiment, the ribs 84 are formed along part of the length of the inner surface of the hollow core member 52 that is subjected to high pressure during a molding cycle to be described. Accordingly, the circumferentially spaced, longitudinally directed coolant return passages 82 begin at the hemispherical return surface 80 and end at approximately the mid point of the hollow core element 52 where it i s fully supported by the core support member outboard of the molded part cavity into which the molten material is directed under high pressures. The passages 82 combine at this point in an elongated annular passage 88 formed between the inner surface 90 of the core support member 50 and the outer surface 92 of the fluid inlet pipe 72. The combined coolant flow through the passage 88 is returned through cooling water discharge openings 94, 96 in a cap member 98 on the core support member 50.

Figure 3:
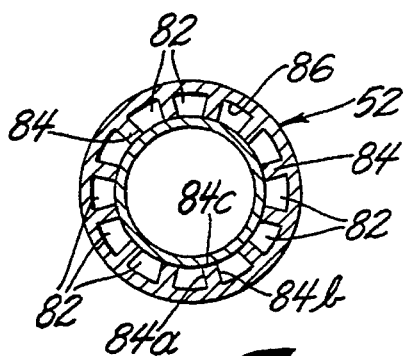
FIG. 3 is an enlarged, sectional view of one mold core assembly taken along the line 3—3 of FIG. 2.
Figure 4:
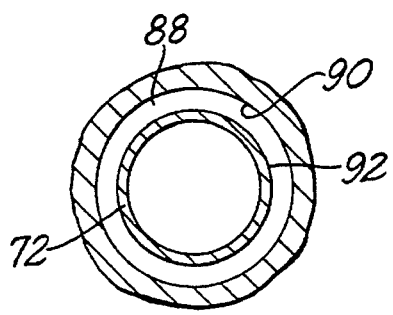
FIG. 4 is an enlarged sectional view taken along the line 4—4 of FIG. 2.
Figure 5:
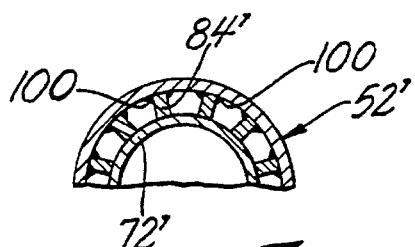
FIG. 5 is a fragmentary enlarged sectional view like FIG. 4 showing another embodiment of the present invention.

In the illustrated embodiment of FIGS. 2 and 3, the ribs 88 are formed integrally of the hollow core member 52. In still another embodiment of the invention shown in FIG. 5, ribs 84' are formed as separate elements bonded to the inner surface of a core member 52' by suitable connections such as a brazed joint 100. As in the previous embodiment, an inlet tube 72' is provided.

In the present invention, high pressure, high temperature plastic material, glass or metal material is injected into each of the molded part cavities 60 through runners 102 diagrammatically shown in hidden line in FIG. 2. As each cavity 60 fills, coolant directed through the coolant inlet pipes 72 (one shown in FIG. 2) flows through the passages 82 extracts heat from the dies across an extended heat transfer surface defined by the surfaces of the ribs 84 shown at 84a, 84b and 84c in FIG. 3 for producing a high thermal capacity mold assembly 10.

Additionally, the ribs 84 serve as reinforcement members on the hollow core member 52 so that it will not distort when the molded part cavity 60 is completely filled with high pressure molten material.

The above-described water cooled core assembly 20 is operated by closing the mold parts. During a fill cycle in which the mold parts 16, 18 are closed along with the mold inserts 40, 44, 46 and 48 molten material is directed from the injector 26 into the runners 102 thence filling the molded part cavities with material that is densified and cooled to form the completed molded parts. Once the molded parts are cooled, the mold parts 16, 18 are opened along the parting line 22, the mold inserts 40, 44, 46 and 48 are spread apart to eject the molded parts.

What is claimed is:

1. In a core assembly for connection between spaced, moveable mold parts one of which has a hollow cavity formed therein and the other of which carries a core insert the improvement comprising:

a core element supported within one of said mold parts and spaced from the hollow cavity therein; said core element having an open end and a closed end defining a hemispherical surface;

said core element further including an outer surface spaced from said hollow cavity for forming the inner surface of a molded part cavity for receiving molten material to be molded to the shape of the molded part cavity and the core element further including an inner surface having a plurality of circumferentially spaced longitudinally directed ribs for reinforcing the core element radially inwardly of the molded part cavity and along the length of said core element against pressure within the molded part cavity.

2. In the core assembly of claim 1, said ribs forming a plurality of coolant passages; a fluid inlet pipe located axially of said inner surface in spaced relationship thereto having one end thereof adapted to be connected to a source of coolant and including a second end thereon in communication with said plurality of coolant passages.

3. In the core assembly of claim 1, said ribs being equally circumferentially spaced to form a plurality of equidistantly spaced coolant flow passages interiorly of said core element.

4. In the core assembly of claim 3, a fluid inlet pipe located axially of said inner surface in spaced relationship thereto having one end thereof adapted to be connected to a source of coolant and including a second end thereon in communication with said plurality of equidistantly spaced coolant flow passages.

5. In the core assembly of claim 1, said ribs formed only along part of the length of the inner surface of the core element; an annular passage formed between said core element and the other of said mold parts; said circumferentially spaced passages communicating with said annular passage at approximately the mid point of the length of said core element.

6. In the core assembly of claim 1, said ribs being integrally connected to the inner surface of said core element.

7. In the core assembly of claim 1, said ribs being separate elements having edge portions thereon; and a bond connection formed between said edge portions and the inner surface of said core element.

8. In the core assembly of claim 2, said ribs being separate elements having edge portions thereon; and a bond connection formed between said edge portions and the inner surface of said core element.

\* \* \* \* \*